(12) United States Patent
Renwick et al.

(10) Patent No.: US 7,216,101 B2
(45) Date of Patent: May 8, 2007

(54) PROCESS FOR CREATING A TRADING PARTNER PROFILE

(75) Inventors: Janice (Jan) Renwick, South Lyon, MI (US); Sharon Light, Canton, MI (US)

(73) Assignee: GXS, Inc., Gaithersburg, MD (US)

( * ) Notice: Subject to any disclaimer, the term of this patent is extended or adjusted under 35 U.S.C. 154(b) by 1151 days.

(21) Appl. No.: 09/748,143

(22) Filed: Dec. 27, 2000

(65) Prior Publication Data

US 2002/0082972 A1   Jun. 27, 2002

(51) Int. Cl.
*G06Q 40/00*   (2006.01)

(52) U.S. Cl. .................. 705/37; 705/1; 705/2; 705/27; 705/26

(58) Field of Classification Search ................ 709/206, 709/300, 223; 364/401, 400; 178/22; 395/761, 395/155; 345/333; 379/111
See application file for complete search history.

(56) References Cited

U.S. PATENT DOCUMENTS

| | | | | |
|---|---|---|---|---|
| 3,798,359 | A * | 3/1974 | Feistel ........................ | 380/37 |
| 4,745,559 | A * | 5/1988 | Willis et al. ................... | 705/37 |
| 5,113,354 | A * | 5/1992 | Harper et al. ............... | 709/219 |
| 5,202,977 | A * | 4/1993 | Pasetes et al. ................. | 703/27 |
| 5,781,914 | A * | 7/1998 | Stork et al. ................... | 715/506 |
| 5,794,001 | A * | 8/1998 | Malone et al. ............... | 345/762 |
| 5,794,206 | A * | 8/1998 | Wilkinson et al. ............. | 705/1 |
| 5,862,325 | A * | 1/1999 | Reed et al. .................. | 709/201 |
| 6,002,395 | A * | 12/1999 | Wagner et al. ............... | 345/763 |
| 6,324,576 | B1 * | 11/2001 | Newcombe et al. ........ | 709/223 |
| 6,389,483 | B1 * | 5/2002 | Larsson ....................... | 719/313 |
| 6,408,303 | B1 * | 6/2002 | Richards ..................... | 707/102 |
| 6,418,400 | B1 * | 7/2002 | Webber ........................ | 703/22 |
| 6,535,591 | B1 * | 3/2003 | Galich et al. ........... | 379/112.06 |
| 6,662,197 | B1 * | 12/2003 | LeCrone et al. ............. | 707/204 |
| 6,697,824 | B1 * | 2/2004 | Bowman-Amuah ......... | 709/229 |
| 2001/0043234 | A1 * | 11/2001 | Kotamarti .................... | 345/746 |
| 2002/0073088 | A1 * | 6/2002 | Beckmann et al. ........... | 707/10 |

* cited by examiner

*Primary Examiner*—Hani M. Kazimi
*Assistant Examiner*—Debra Charles
(74) *Attorney, Agent, or Firm*—Foley & Lardner LLP

(57) ABSTRACT

A function in an application integrator system for business-to-business e-commerce automatically creates trading partner profiles during translation stages. The function is activated by an exception event auto-create flag for an interworking standard being set to auto-create. Also, each standard has interchange, functional group, and message templates. These templates are used to extract data from the inbound document and automatically populate a profile record for the sending trading partner.

12 Claims, 6 Drawing Sheets

PROCESS FOR CREATING A TRADING PARTNER PROFILE

BACKGROUND OF THE INVENTION

The invention relates to creation of profiles for trading partners in business-to-business data processing systems.

One of the problems involved in effective automation of business processes is that of the profiles of trading partners being incomplete, inaccurate, or non-existing. This has led to a very "patchy" level of automation because manual interactive involvement is frequently required to allow processes to continue. This problem exists irrespective of how comprehensive the automated process is and so it can be very frustrating.

It is known to provide an application to address some of these problems, namely an application called "VLT" marketed by RMS Electronic Commerce Systems, Inc. This product creates a trading partner profile with a narrow focus in the trading community, supporting only a limited number of inbound document formats. Also, this application provides for use of only limited information for creation of profiles.

It is therefore an object of the invention to provide for more comprehensive automatic creation of trading partner profiles.

Another object is to provide for creation of profiles which are more comprehensive and useful.

SUMMARY OF THE INVENTION

According to the invention, there is provided a method for processing an inbound document received from a trading partner in a business-to-business electronic commerce data processing system, the method comprising the steps of:
  storing templates for automatically creating trading partner profiles,
  receiving an inbound document from a trading partner,
  determining if a profile for said trading partner is stored in a profile database, and if no such profile is stored, automatically creating a profile by:
    retrieving a template associated with the inbound document;
    reading the template to determine what data is to be extracted from the inbound document and extracting said data; and
    creating a profile record for the trading partner in the profile database and populating said profile record with said extracted data.

In one embodiment, the profile is automatically created if an auto-creation flag is pre-set.

In another embodiment, the system stores an auto-creation flag for each of a plurality of interworking standards, and the system determines the relevant standard associated with the received inbound document and determines if there is an auto-creation flag for said standard.

Preferably, the auto-creation flag is stored in an exception flag dataset.

In one embodiment, the exception flag dataset includes flags for control number discrepancy, count number discrepancy, missing trailer, header parsing failure, source message error, and target message error, exception events.

In another embodiment, there is at least one interchange template, and each such template is associated with an interworking interchange envelope.

In a further embodiment, there is at least one functional group template, and each such template is associated with a functional group envelope.

In one embodiment, there is at least one message template, and each such template is associated with a message envelope.

In one embodiment, there is at least one message template for each of:
  a specific version of an interworking standard and specific message type;
  a standard with any version; and
  any version and any message for a specific standard.

In another embodiment, each template is associated with a stored template record, each said record comprising:
  a key having a substitution label and a value, said substitution label being associated with a value entry field of the template, and wherein:
    the step of reading the template to determine data to be extracted comprises assigning the label to a variable name of the inbound document, and said variable name is read from the inbound document.

According to another aspect, the invention provides a method for processing an inbound document received from a trading partner in a business-to-business electronic commerce data processing system, the method comprising the steps of:
  storing templates for automatically creating trading partner profiles,
  receiving an inbound document from a trading partner,
  determining if a profile for said trading partner is stored in a profile database, and if no such profile is stored, automatically creating a profile by:
    retrieving a template associated with the inbound document;
    reading the template to determine what data is to be extracted from the inbound document and extracting said data; and
    creating a profile record for the trading partner in the profile database and populating said profile record with said extracted data, and
  in which:
    automatic creation of a profile is initiated by an exception event being raised, and reading a set of exception flags to determine if an auto-creation flag is set, and
    the system reads an interchange template to determine data to be extracted from an interchange envelope, a functional group template to determine data to be extracted from a functional group envelope, and a message template to determine data to be extracted from a message envelope.

BRIEF DESCRIPTION OF THE DRAWINGS

The invention will be more clearly understood from the following description of some embodiments thereof, given by way of example only with reference to the accompanying drawings in which.

DETAILED DESCRIPTION OF THE INVENTION

A system performs various business-to-business operations including processing of inbound trading partner data (de-enveloping) for all supported standards, processing of outbound application data (enveloping) for all supported standards, reporting of processing activities, trading partner verification, ID code verification, error handling, and others.

This system includes a trading partner "auto create" function. This function automatically creates a trading partner profile where one does not exist in response to reception of transaction data in an inbound document from the relevant trading partner for the first time. It therefore greatly reduces administration manpower requirements and allows automated business-to-business processes to continue uninterrupted.

The function maintains a set of exception flags associated with each of a number of interworking standards for business-to-business communication. The standards include:

ASC X12, which supports the ISA-IEA as the Interchange, the GS-GE as the Functional Group, and the ST-SE as the Message.

TDCC, which supports the BG-EG as the Interchange, the GS-GE as the Interchange or Functional Group, and the ST-SE as the Message.

UN/EDIFACT, which supports the UNA, UNB-UNZ as the Interchange, the UNG-UNE as the Functional Group, and the UNH-UNT as the Message.

TRADACOMS, which supports the STX-END as the Interchange and the MHD-MTR as the File Format (Message).

CII/EIAJ, which supports the Message Group and Message.

RosettaNet, which supports Partner Information, Service Header, Transaction/Action Information.

xCBL, which supports Trading Partner and Message.

Figure 1:
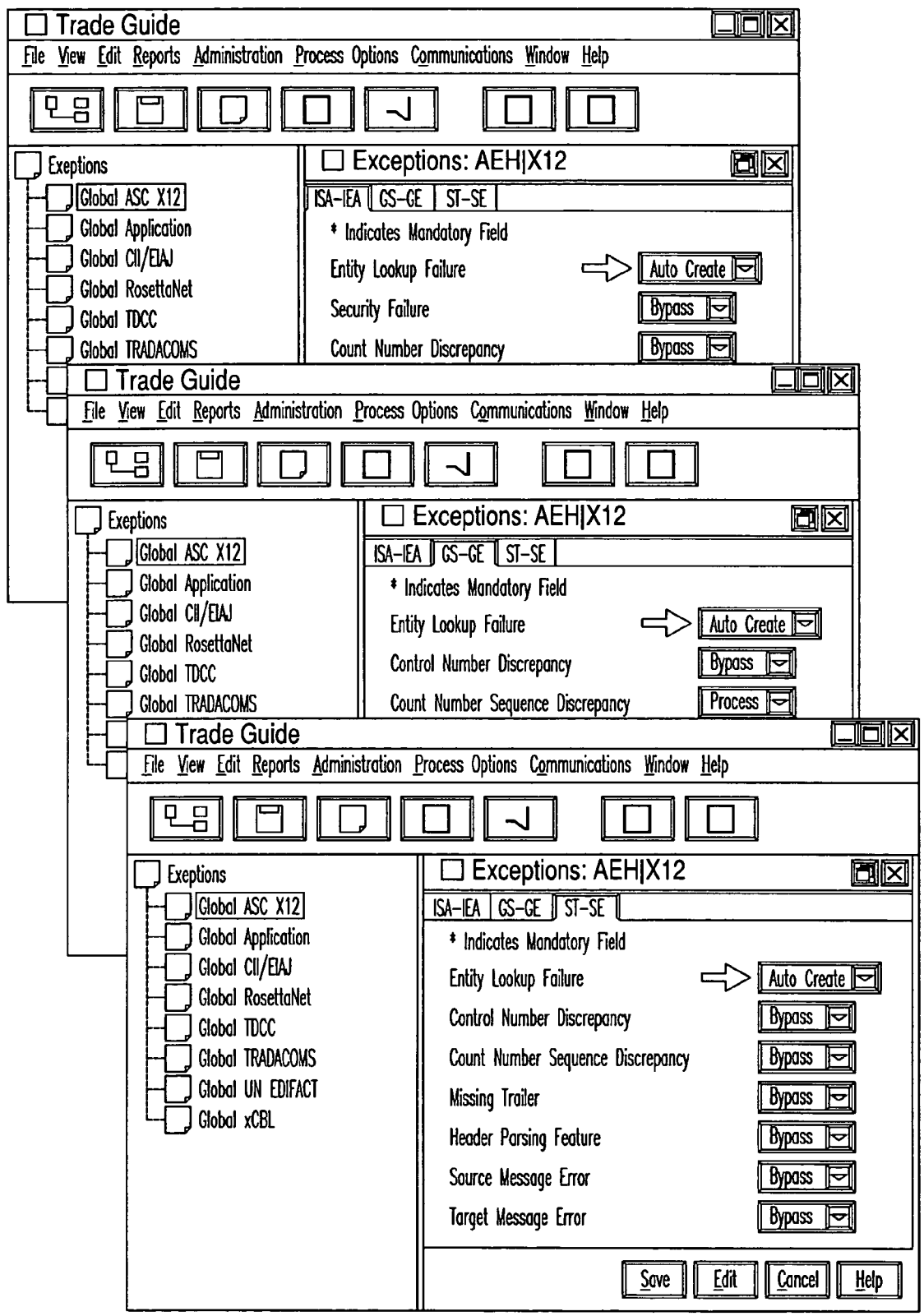
FIG. 1 is a set of sample screen shots illustrating setting of flags for exception management in a system.

For each of the standard's levels the function stores a flag indicating if auto-creation should be implemented. This is indicated in FIG. 1. The conditions are "Entity Lookup Failure", and as shown in FIG. 1 flags may be set for a variety of other conditions such as "security failure", "control number discrepancy", "count number discrepancy", missing trailer, header parsing failure, source message error, and target message error. The flag may be set to "Bypass" for any of these conditions.

Figure 2A:
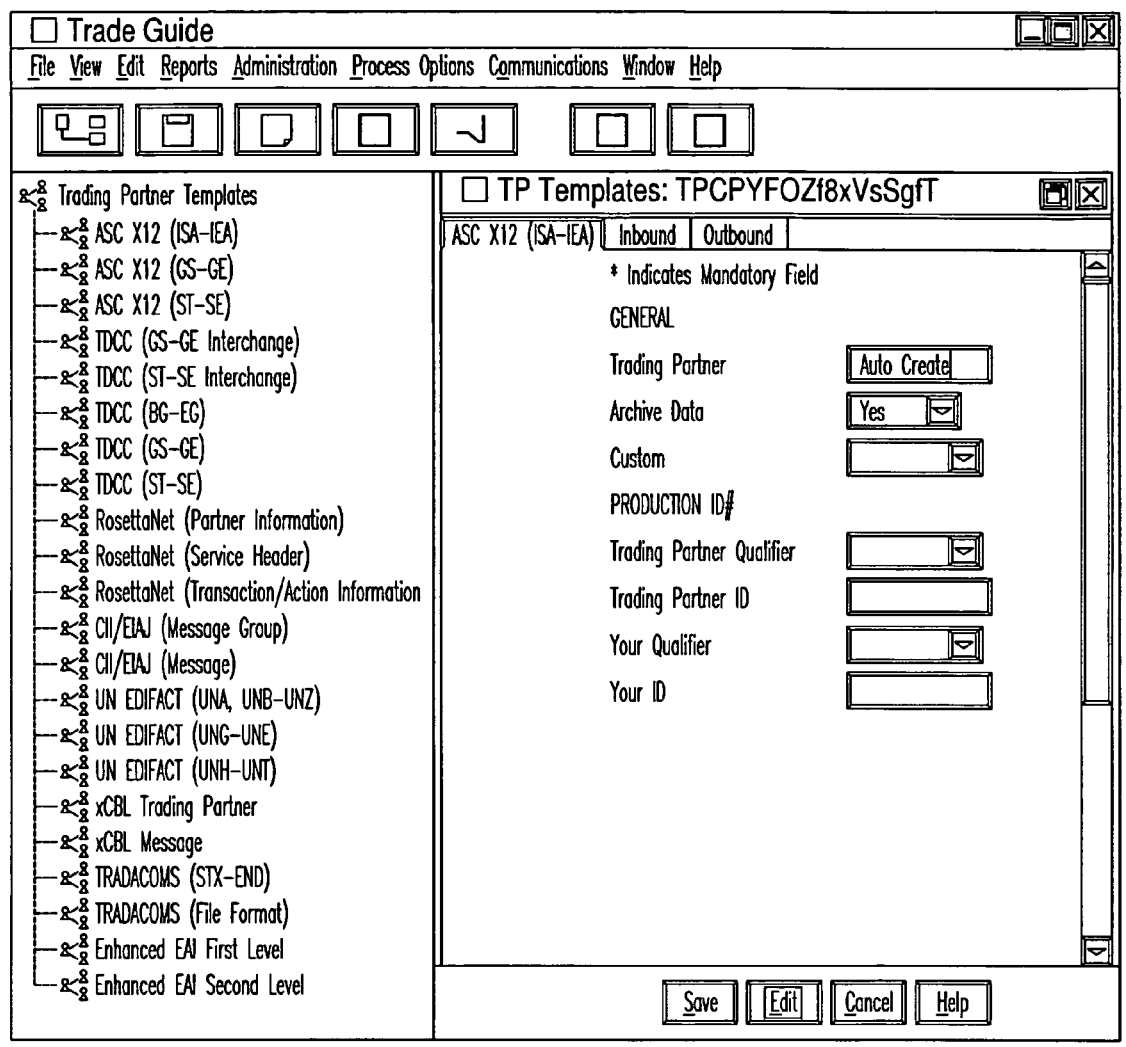
FIGS. 2(*a*) and 2(*b*) are sample screen shots illustrating trading partner templates.
Figure 2B:
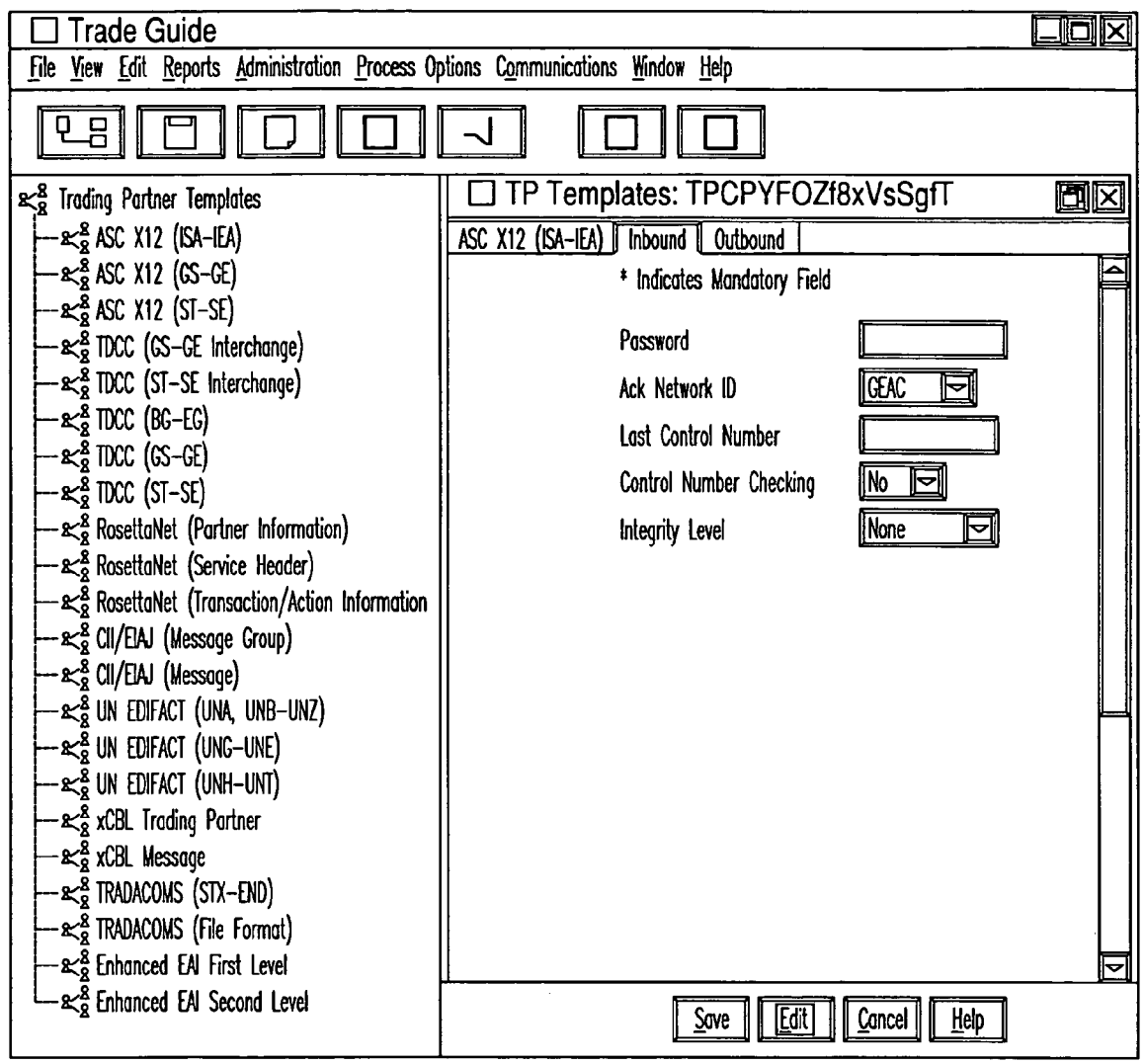

The function allows the user to create templates of default information for use if values are missing from a received document. As shown in FIGS. 2(a) and 2(b) the user selects a type of template, there being one type per standard level. In the examples illustrated template types for the ISA-IEA, the GS-GE, and the ST-SE levels of the ASC X12 standard are chosen.

The templates fall into interchange, functional group, and message types.

Interchange Template

An interchange template is information that pertains to the processing of an interchange envelope. When an interchange template is created, the values entered are written to a template record in a profile database. The record created has two parts, a key including a substitution label and the value. Each field or value entry box on the template screen has a substitution label assigned to it. During the auto create processing, one step is to determine if there is an interchange template available if a template is recognised, a read of the profile database takes place. The value portion of the template record, based on the key including the substitution label, is assigned to a specific variable name. The variable name is then read. Information from the trading partner's data and the template values are used together to write the new record into the Profile database. Then processing continues as normal.

Functional Group Template

A functional group template is information that pertains to the processing of the functional group envelope. Processing of the functional group template is as described above for interchange template processing.

Message Template

A message template is information that pertains to the processing of the message envelope. Processing of the message template is as described above for interchange template processing. There are three types of message templates that can be defined by the user. The first is most specific, a specific message for a specific version for the chosen standard. For example, the chosen standard may be ASC X12, the version 004010, and the message an 810 (Invoice). The information defined in this template pertains to the 810 for version 004010 for the ASC X12 standard. The next is specific to a message for the chosen standard. For example, the chosen standard may be UN/EDIFACT and the message an INVOIC (Invoice). The information defined in this template would pertain to the INVOIC for any version for the UN/EDIFACT standard. The last is the least specific, as it applies to any version and any message for the chosen standard. For example, if the chosen standard is ASC X12, the information defined in this template pertains to any message for any version for the ASC X12 standard.

The auto create function creates a profile record in a profile database and populates it automatically by extracting certain values from the inbound documents according to the templates. For example, for the ASC X12 ISA-IEA (interchange) level the following values are extracted: the sender qualifier, the sender ID, the receiver qualifier, the receiver ID. For the ASC X12 GS-GE (functional group) level the following values are extracted: the sender ID and the receiver ID. For the ASC X12 ST-SE (message) level the following values are extracted: the version from the functional group level and the transaction code from the message level.

Figure 3:
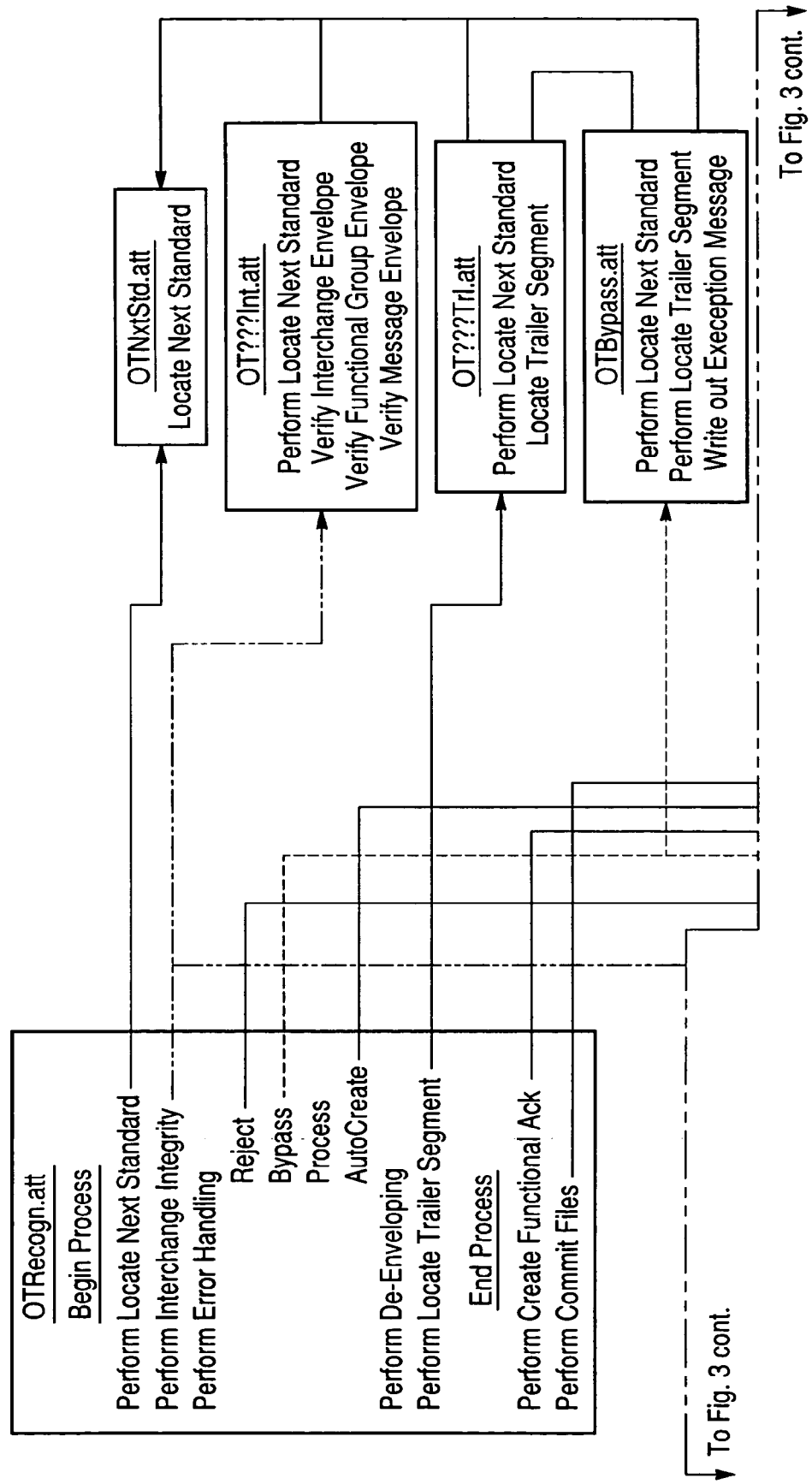
FIG. 3 is a flow diagram illustrating steps for creation of a profile.
Figure 3:
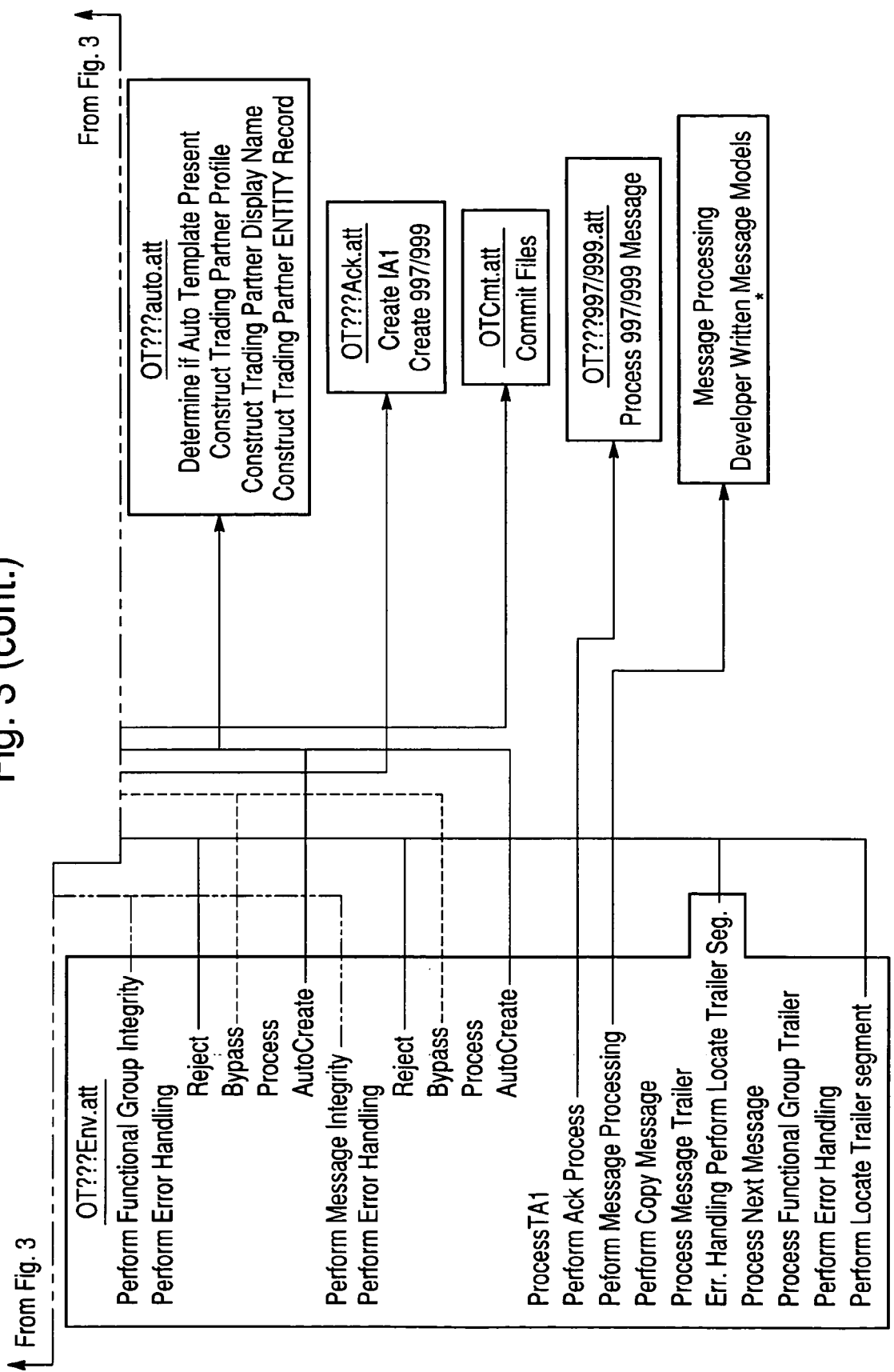

Referring to FIG. 3, a process carried out by the function for automatically creating a profile for a trading partner is illustrated. Processing begins with a Recognition map component file, OTRecogn.att. It locates the start of a standard by attaching to a map component file OTNxtStd.att. Once a standard has been recognised the process returns to OTRecogn.att and the entity (trading partner) lookup takes place. If the entity is validated, then processing continues as normal. If the entity is not validated, a lookup into an exception management function takes place to determine how the "Entity Lookup Failure" error is to be handled. If the entity lookup failure event flag is set to "AutoCreate", OTRecogn.att attaches to an appropriate map component file for the recognised standard being processed. For example, if the standard being processed is ASC X12, the map component file attached to it will be OTX12Auto.att. OTX12Auto.att processes first the Interchange level, then the process is repeated, if the proper flag is set in Exception Management, for the functional group and message levels. Processing then continues as normal.

OT???Env.att (the "???" presents the standard, for example, for ASC X12 it is "X12") processes the functional group and message level for the standard being processed. Much like OTRecogn.att and OTNxtStd.att, OT???Env.att performs an entity lookup for the recognised level, if not present in the profile database, it checks the flag set in exception management. If set to "AutoCreate", the appropriate map component file for the recognised standard being processed is attached.

Figure 4:
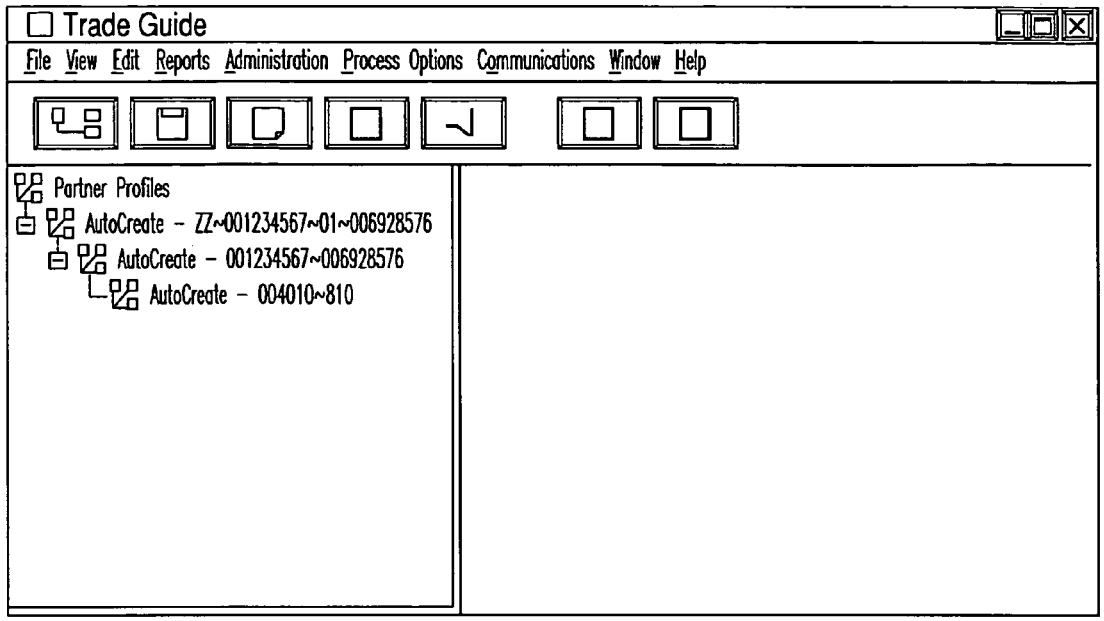
FIG. 4 is a sample screen shot illustrating an automatically created profile.

The process happens transparently to the user and allows automated business processes to continue. At a subsequent, offline, stage the function automatically presents the recent automatically-created profiles at the top of the trading partner list. This is illustrated in FIG. 4, in which a specific name is assigned to each profile based on values for the trading partner data and the user is presented with a button to allow viewing and editing of the profile.

Figure 5:
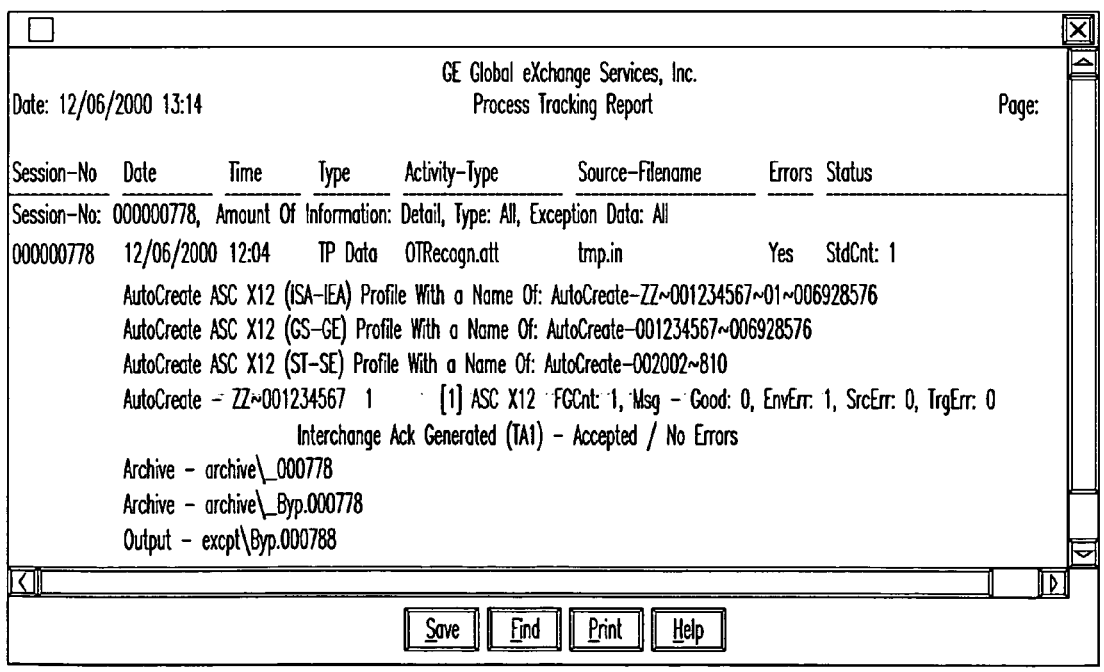
FIG. 5 is a sample screen shot illustrating a process activity database report.

The function also automatically writes records to a process activity database, said records containing data relating to profiles which have been automatically created. An example is shown in FIG. 5. The data is only a pointer to the relevant profile and the user must use the menu shown in FIG. 4 for access to the profile itself.

The invention is not limited to the embodiments described but may be varied in construction and detail.

What is claimed is:

1. A method for processing an inbound document received from a trading partner in a business-to-business electronic commerce data processing system, the method comprising the steps of:
   storing templates for automatically creating trading partner profiles,
   receiving an inbound document from a trading partner,
   determining if a profile for said trading partner is stored in a profile database, and if no such profile is stored, automatically creating a profile by:
      retrieving a template associated with the inbound document;
      reading the template to determine what data is to be extracted from the inbound document and extracting said data; and
      creating a profile record for the trading partner in the profile database and populating said profile record with said extracted data,
   wherein the profile is automatically created only if an auto-creation flag is pre-set, and
   wherein the system stores an auto-creation flag for each of a plurality of interworking standards, and the system determines the relevant standard associated with the received inbound document and determines if there is an auto-creation flag set for the determined standard.

2. A method as claimed in claim 1, wherein the auto-creation flag is stored in an exception flag dataset.

3. A method as claimed in claim 2, wherein the exception flag dataset includes flags for control number discrepancy, count number discrepancy, missing trailer, header parsing failure, source message error, and target message error, exception events.

4. A method as claimed in claim 1, wherein there is at least one interchange template, and each such template is associated with an interworking interchange envelope.

5. A method as claimed in claim 1, wherein there is at least one functional group template, and each such template is associated with a functional group envelope.

6. A method as claimed in claim 1, wherein there is at least one message template, and each such template is associated with a message envelope.

7. A method as claimed in claim 4, wherein there is at least one message template for each of:
   a specific version of an interworking standard and specific message type;
   a standard with any version; and
   any version and any message for a specific standard.

8. A method as claimed in claim 1, wherein each template is associated with a stored template record, each said record comprising:
   a key having a substitution label and a value, said substitution label being associated with a value entry field of the template, and wherein:
   the step of reading the template to determine data to be extracted comprises assigning the label to a variable name of the inbound document, and said variable name is read from the inbound document.

9. A method for processing an inbound document received from a trading partner in a business-to-business electronic commerce data processing system, the method comprising the steps of:
   storing templates for automatically creating trading partner profiles,
   receiving an inbound document from a trading partner,
   determining if a profile for said trading partner is stored in a profile database, and if no such profile is stored, automatically creating a profile by:
      retrieving a template associated with the inbound document;
      reading the template to determine what data is to be extracted from the inbound document and extracting said data; and
      creating a profile record for the trading partner in the profile database and populating said profile record with said extracted data, and in which:
      automatic creation of a profile is initiated by an exception event being raised, and reading a set of exception flags to determine if an auto-creation flag is set wherein an auto-creation flag is stored for each of a plurality of interworking standards and the automatic creation of the profile is initiated only if the auto-creation flag is set for the particular interworking standard associated with the inbound document, and
      the system reads an interchange template to determine data to be extracted from an interchange envelope, a functional group template to determine data to be extracted from a functional group envelope, and a message template to determine data to be extracted from a message envelope.

10. A method as claimed in claim 9, wherein the templates are retrieved from a map component file associated with the interworking standard of the inbound document.

11. An electronic commerce data processing system comprising means for performing the steps of claim 1.

12. A program product for processing an inbound document received from a trading partner in a business-to-business electronic commerce data processing system, said program product comprising machine-readable program code for causing, when executed, one or more machines to perform the following method steps:

storing templates for automatically creating trading partner profiles, receiving an inbound document from a trading partner, determining if a profile for said trading partner is stored in a profile database, and if no such profile is stored, automatically creating a profile by:

retrieving a template associated with the inbound document;

reading the template to determine what data is to be extracted from the inbound document and extracting said data; and creating a profile record for the trading partner in the profile database and populating said profile record with said extracted data, wherein the profile is automatically created only if an auto-creation flag is pre-set, and wherein the system stores an auto-creation flag for each of a plurality of interworking standards, and the system determines the relevant standard associated with the received inbound document and determines if there is an auto-creation flag for said standard.

* * * * *